(12) United States Patent
Anderson et al.

(10) Patent No.: US 7,839,407 B2
(45) Date of Patent: *Nov. 23, 2010

(54) METHODS AND APPARATUS FOR ACCELERATED ANIMATION USING POINT MULTIPLICATION

(75) Inventors: John Anderson, San Anselmo, CA (US); Mark Meyer, San Francisco, CA (US)

(73) Assignee: Pixar, Emeryville, CA (US)

( * ) Notice: Subject to any disclaimer, the term of this patent is extended or adjusted under 35 U.S.C. 154(b) by 683 days.

This patent is subject to a terminal disclaimer.

(21) Appl. No.: 11/626,199

(22) Filed: Jan. 23, 2007

(65) Prior Publication Data

US 2007/0171227 A1     Jul. 26, 2007

Related U.S. Application Data

(60) Provisional application No. 60/762,475, filed on Jan. 25, 2006.

(51) Int. Cl.
  *G06T 13/00* (2006.01)
(52) U.S. Cl. .................................................. 345/473
(58) Field of Classification Search .................. 345/473
  See application file for complete search history.

(56) References Cited

U.S. PATENT DOCUMENTS 6,069,631 A * 5/2000 Tao et al. ..................... 345/418
6,606,095 B1 * 8/2003 Lengyel et al. ............. 345/473

* cited by examiner

*Primary Examiner*—Xiao M Wu
*Assistant Examiner*—Maurice McDowell, Jr.
(74) *Attorney, Agent, or Firm*—Townsend and Townsend and Crew LLP

(57) ABSTRACT

A method for a computer system includes determining an animation variable response subspace within an animation variable response space associated with an animation variable, in response to a set of training data for the animation variable, determining a set of characteristic calculation key points configured to allow navigation within the animation variable response subspace, calculating animation variable response values for the set of characteristic calculation key points in the animation variable response subspace in response to input data for the animation variable, and predicting animation variable response values for a set of points within the animation variable response space in response to animation variable response values for the set of characteristic calculation key points in the animation variable response subspace.

25 Claims, 8 Drawing Sheets

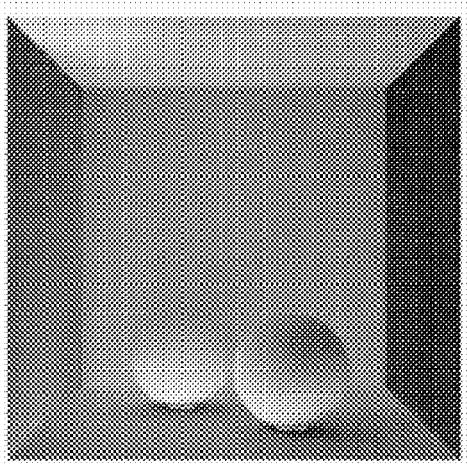
FIG. 6B1
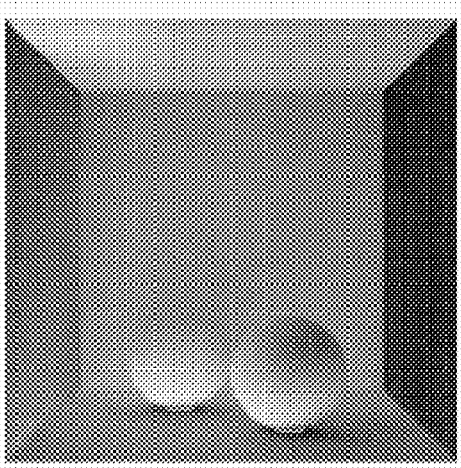
FIG. 6B2
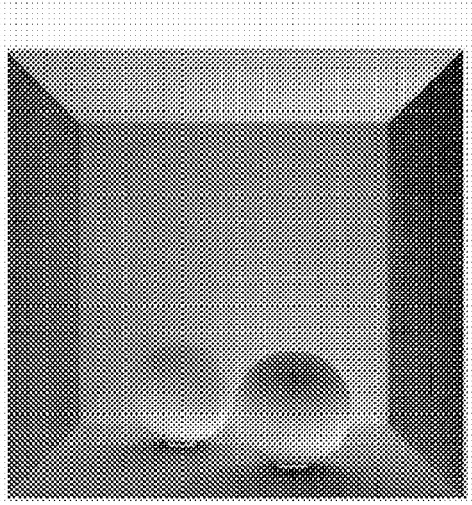
FIG. 6C1
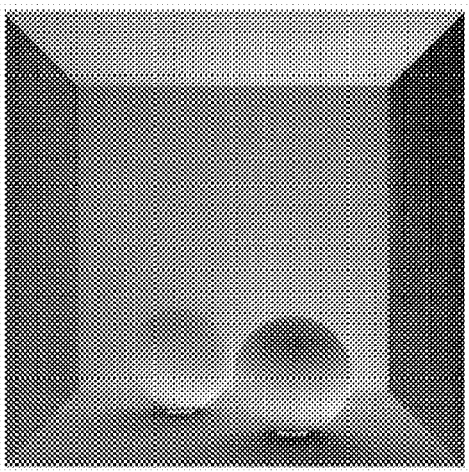
FIG. 6C2
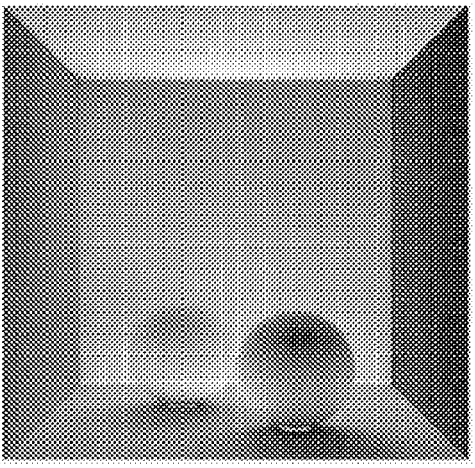
FIG. 6D1
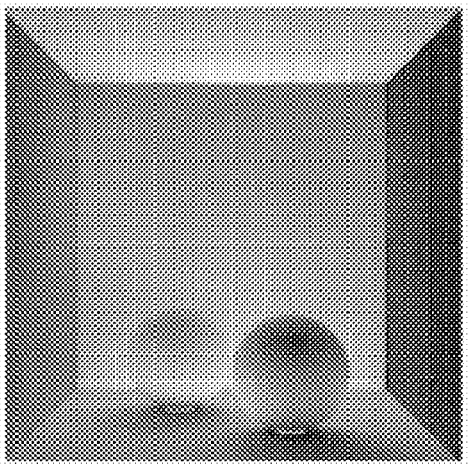
FIG. 6D2

METHODS AND APPARATUS FOR ACCELERATED ANIMATION USING POINT MULTIPLICATION

CROSS-REFERENCE TO RELATED APPLICATIONS

The present application claims priority to Provisional Application No. 60/762,475, filed Jan. 25, 2006. The present application is also related to U.S. application Ser. No. 11/626,214, filed Jan. 23, 2007, titled: Methods And Apparatus For Accelerated Animation Using Point Multiplication and Soft Caching. These disclosures are hereby incorporated by reference in their entirety for all purposes.

BACKGROUND OF THE INVENTION

The present invention relates to computer animation. More specifically, the present invention relates to methods and apparatus for accelerating aspects of computer animation including surface calculation, rendering, and the like.

Throughout the years, movie makers have often tried to tell stories involving make-believe creatures, far away places, and fantastic things. To do so, they have often relied on animation techniques to bring the make-believe to "life." Two of the major paths in animation have traditionally included, drawing-based animation techniques and stop motion animation techniques.

Drawing-based animation techniques were refined in the twentieth century, by movie makers such as Walt Disney and used in movies such as "Snow White and the Seven Dwarfs"1937) and "Fantasia"1940). This animation technique typically required artists to hand-draw (or paint) animated images onto a transparent media or cels. After painting, each cel would then be captured or recorded onto film as one or more frames in a movie.

Stop motion-based animation techniques typically required the construction of miniature sets, props, and characters. The filmmakers would construct the sets, add props, and position the miniature characters in a pose. After the animator was happy with how everything was arranged, one or more frames of film would be taken of that specific arrangement. Stop motion animation techniques were developed by movie makers such as Willis O'Brien for movies such as "King Kong"1933). Subsequently, these techniques were refined by animators such as Ray Harryhausen for movies including "Mighty Joe Young" (1948) and Clash Of The Titans (1981).

With the wide-spread availability of computers in the later part of the twentieth century, animators began to rely upon computers to assist in the animation process. This included using computers to facilitate drawing-based animation, for example, by painting images, by generating in-between images ("tweening"), and the like. This also included using computers to augment stop motion animation techniques. For example, physical models could be represented by virtual models in computer memory, and manipulated.

One of the pioneering companies in the computer-aided animation (CA) industry was Pixar. Pixar is more widely known as Pixar Animation Studios, the creators of animated features such as "Toy Story"1995) and "Toy Story 2" (1999), "A Bugs Life" (1998), "Monsters, Inc." (2001), "Finding Nemo" (2003), "The Incredibles" (2004), "Cars" (2006) and others. In addition to creating animated features, Pixar developed computing platforms specially designed for CA, and CA software now known as RenderMan®. RenderMan® was particularly well received in the animation industry and recognized with two Academy Awards®. The RenderMan® software included a "rendering engine" that "rendered" or converted geometric and/or mathematical descriptions of objects into a two dimensional image.

The definition and posing of geometric object and/or illumination object descriptions has typically been a time consuming process, accordingly, statistical models have been used to represent such objects. The use of statistical models for calculations in graphics have included the creation of a kinematic articulation model which is trained from poses which can be generated from either physical simulations or hand corrected posed models. Approaches have been based on a pose based interpolation scheme in animation variables or based upon approximation on multiple coefficient weighting of the positions of points in various skeletal articulation frames. Such approaches do not require the posing of key points, a limitation that precludes the use of models depending upon history based simulation for posing.

Drawbacks to kinematic articulation schemes are related to their generality—the required training sets for such techniques can be very large. Additionally, in practice, it is essentially impossible to place bounds on the errors of the reconstructions when new poses are specified which are far from those included in the training set of poses.

Some techniques for real time deformation of a character surface have used a principal component analysis of joint angles to compute a basis for surface displacements resulting from perturbing each joints of a model in example poses. Given several example poses consisting of joint angles and surface displacements, specific joint angle values can be associated with coordinates in the basis space by projecting the surface displacement into the basis. Surface displacements for novel joint angle configurations are thus computed by using the joint angles to interpolate the basis coordinates, and the resulting coordinates determine surface a displacement represented in the subspace formed by the basis.

Drawbacks to use of principle component analysis for animation, described above, include that they such analyses rely upon use of animation variables such as joint angles or light positions to drive a subspace model.

FIG. 1A illustrates a schematic block diagram of a general statistical modeling approach. In this general approach, a statistical model 10 is first determined to accept the animation variables 20 (posing controls, light positions and properties). Subsequently, the statistical model 10 produces the desired outputs 30 (point positions or illumination values).

Problems with this most general approach includes that the relationships between the input controls (animation variables 20) and the outputs 30 can be highly nonlinear. As an example, it is common to use an articulation variable to set either sensitivity or pivot point of another variable, thus the behavior may often be extremely nonlinear. Accordingly, it is essentially impossible to statistically discover a useful basis from typical training sets.

Accordingly, what is desired are improved methods and apparatus for solving the problems discussed above, while reducing the drawbacks discussed above.

BRIEF SUMMARY OF THE INVENTION

The present invention relates to computer animation. More specifically, the present invention relates to methods and apparatus for accelerating various time-consuming processes of computer animation such as posing of objects, global illumination computations, and the like.

Various embodiments of the present invention disclose Point Multiplication processes that are statistical acceleration schemes. Such embodiments first identify a set of characteristic key points in a graphical calculation, such as posing or rendering. Next, graphical calculations are performed for the various key points to provide a subspace based estimate of the entire or full geometric calculation. Embodiments of the Point Multiplication process are useful acceleration schemes when the geometric calculation requirements for evaluating key point values are substantially lower than for evaluating the full set of points. Calculations of this sort occur in many areas of graphics such as articulation and rendering.

Embodiments of the present invention that are directed to accelerated global illumination computations involve the use of importance sampling. Embodiments use prior knowledge about the light transport within the scene geometry, as observed from the training set, to optimize importance sampling operations.

FIG. 1B illustrates a block diagram according to various embodiments of the present invention. In various embodiments, a training set of animation data is used to create a statistical subspace model, from which values of key points are determined. The posing engine 50 is then driven at runtime with animation data 40 to determine values 60 for the set of key points. In some embodiments, the output values 70 are linearly related with respect the key point values 60. Accordingly, the selected key points 60 from the training set may describe many/all of the important nonlinearities of the problem.

According to one aspect of the invention, a method for a computer system is described. One technique includes determining an animation variable response subspace within an animation variable response space associated with an animation variable, in response to a set of training data for the animation variable, and determining a set of characteristic calculation key points configured to allow navigation within the animation variable response subspace. A process includes calculating animation variable response values for the set of characteristic calculation key points in the animation variable response subspace in response to input data for the animation variable, and predicting animation variable response values for a set of points within the animation variable response space in response to animation variable response values for the set of characteristic calculation key points in the animation variable response subspace.

According to another aspect of the invention, a computer system is described. An apparatus includes a memory configured to store a set of training data for an animation variable, and a processor coupled to the memory. The processor is configured to determining an animation variable response subspace within an animation variable response space, in response to a set of training data for the animation variable, and the processor is configured to determine a set of characteristic calculation points configured to allow navigation within the animation variable response subspace. In various systems the processor is configured to calculate animation variable response values for the set of characteristic calculation points in the animation variable response subspace in response to input data for the animation variable, and the processor is configured to predict animation variable response values for a set of points within the animation variable response space in response to animation variable response values for the set of characteristic calculation points in the animation variable response subspace.

According to one aspect of the invention, a computer program product on a computer-readable tangible media for a computer system including a processor is described. The tangible media includes code that directs a processor to determine an animation variable response subspace within an animation variable response space associated with an animation variable, in response to a set of training data for the animation variable, and code that directs a processor to determine a set of characteristic calculation key points configured to allow navigation within the animation variable response subspace. The media may include code that directs a processor to calculate animation variable response values for the set of characteristic calculation key points in the animation variable response subspace in response to input data for the animation variable, and code that directs a processor to predict animation variable response values for a set of points within the animation variable response space in response to animation variable response values for the set of characteristic calculation key points in the animation variable response subspace. The codes typically reside on a computer-readable tangible media, such as a semiconductor media (e.g. RAM, flash memory), magnetic media (e.g. hard disk, SAN), optical media (e.g. CD, DVD, barcode), or the like.

BRIEF DESCRIPTION OF THE DRAWINGS

In order to more fully understand the present invention, reference is made to the accompanying drawings. Understanding that these drawings are not to be considered limitations in the scope of the invention, the presently described embodiments and the presently understood best mode of the invention are described with additional detail through use of the accompanying drawings.

DETAILED DESCRIPTION OF THE INVENTION

Hardware Overview

Figure 2:
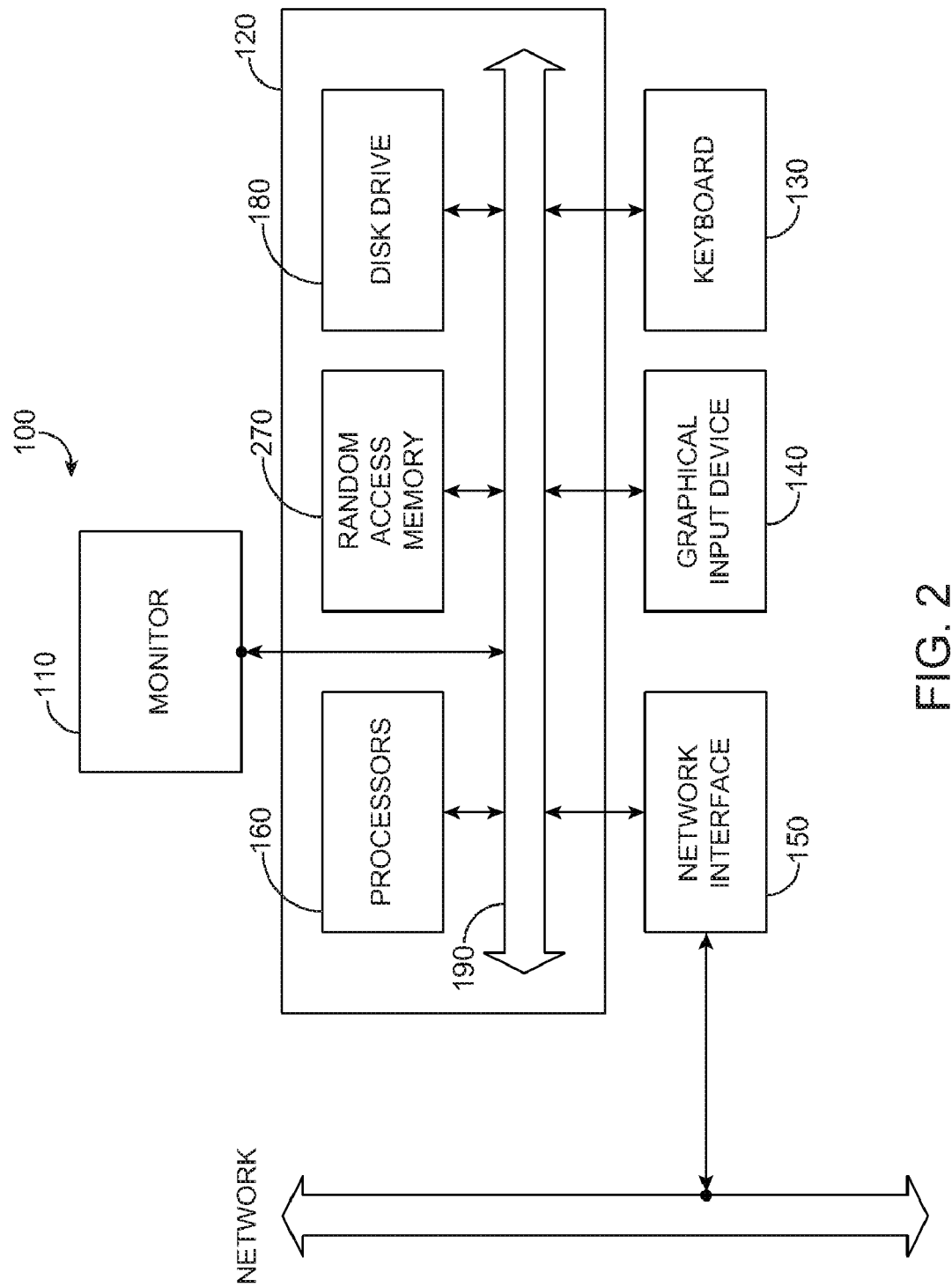
FIG. 2 is a block diagram of typical computer system 100 according to an embodiment of the present invention.

FIG. 2 is a block diagram of typical computer system 100 according to an embodiment of the present invention. In the present embodiment, computer system 100 typically includes a monitor 110, computer 120, a keyboard 130, a user input device 140, computer interfaces 150, and the like.

In the present embodiment, user input device 140 is typically embodied as a computer mouse, a trackball, a track pad, a joystick, wireless remote, drawing tablet, voice command system, eye tracking system, and the like. User input device 140 typically allows a user to select objects, icons, text and the like that appear on the monitor 110 via a command such as a click of a button or the like.

Embodiments of computer interfaces 150 typically include an Ethernet card, a modem (telephone, satellite, cable, ISDN), (asynchronous) digital subscriber line (DSL) unit, FireWire interface, USB interface, and the like. For example, computer interfaces 150 may be coupled to a computer network, to a FireWire bus, or the like. In other embodiments, computer interfaces 150 may be physically integrated on the motherboard of computer 120, may be a software program, such as soft DSL, or the like.

In various embodiments, computer 120 typically includes familiar computer components such as a processor 160, and memory storage devices, such as a random access memory (RAM) 170, disk drives 180, and system bus 190 interconnecting the above components.

In one embodiment, computer 120 includes one or more Xeon microprocessors from Intel. Further, in one embodiment, computer 120 typically includes a UNIX-based operating system.

RAM 170 and disk drive 180 are examples of tangible media configured to store data such as an animation environment, models including geometrical descriptions of objects descriptions of illumination sources, procedural descriptions of models, frames of training data, a specification of key points, embodiments of the present invention, including executable computer code, human readable code, or the like. Other types of tangible media include floppy disks, removable hard disks, optical storage media such as CD-ROMS, DVDs and bar codes, semiconductor memories such as flash memories, read-only-memories (ROMS), battery-backed volatile memories, networked storage devices, and the like.

In the present embodiment, computer system 100 may also include software that enables communications over a network such as the HTTP, TCP/IP, RTP/RTSP protocols, and the like. In alternative embodiments of the present invention, other communications software and transfer protocols may also be used, for example IPX, UDP or the like.

FIG. 2 representative of a computer system capable of embodying the present invention. It will be readily apparent to one of ordinary skill in the art that many other hardware and software configurations are suitable for use with the present invention. For example, the computer may be a desktop, portable, rack-mounted or tablet configuration. Additionally, the computer may be a series of networked computers. Further, the use of other micro processors are contemplated, such as Xeon™, Pentium™ or Core™ microprocessors; Turion™ 64, Opteron™ or AthlonXP™ microprocessors from Advanced Micro Devices, Inc; and the like. Further, other types of operating systems are contemplated, such as Windows®, WindowsXP®, WindowsNT®, or the like from Microsoft Corporation, Solaris from Sun Microsystems, LINUX, UNIX, and the like. In still other embodiments, the techniques described above may be implemented upon a chip or an auxiliary processing board (e.g. graphics processor unit).

Mathematical Basis for Animation and Rendering Subspaces

Embodiments of the present invention use subspace descriptions to reduce the number of degrees of freedom. Embodiments begin with a definition of set of training frames of a state variable Q. In various embodiments, the training data may include a position value, an illumination value, or the like. Additionally, the training data are intended to exercise the pose space of the system to be accelerated. Next, a set of basis functions $a_i(x)$ and $b_i(t)$ are computed, where x is a generalized "space" coordinate which identifies the point and t is a "time" coordinate indexing the training frames:

$$\hat{Q}(x, t) = \sum_{i=1}^{M} a_i(x) b_i(t)$$

Here $\hat{Q}$ is an M dimensional subspace approximation to Q. Since, in some embodiments of the present invention, x and t are discrete variables, it is notationally convenient to rewrite the previous equation as:

$$\hat{Q}[x, t] = \sum_{i=1}^{M} a_i[x] b_i[t]$$

In this relationship, $\hat{Q}$ (similarly Q) is a matrix indexed by x and t, a is a vector indexed by x, and b is a vector indexed by t. Using an Empirical Orthogonal Function EOF (and the closely related singular value decomposition (SVD) values for the a's and b's are determined. The a's and b's are determined such that the least squares errors is reduced (e.g. lessened, minimized) for all values of M, by finding the eigenvectors of the two covariance matrices $QQ^T$ and $Q^TQ$. In various embodiments, these two matrices have the same set of eigenvalues up to the reduced (e.g. lessened, minimum) number of x's and t's. In the above representation, $a_1$, [x] and $b_1$ [t] are the eigenvectors with the largest eigenvalues, $a_2[x]$ is associated with the second largest eigenvalue, etc. In the present disclosure, the a's represent the subspace basis vectors and the b's represent the pose space coordinates.

This particular decomposition has a number of advantageous properties. One important property is that it is sequential, i.e., for M=1 the first set of vectors are determined. Next, by performing the same analysis on the residual data, $(Q-\hat{Q})$ a second set of vectors is determined, and so on. This iterative processes described herein are numerically attractive methods for computing the subspace, since the largest mode can be easily found from a factored power method without computing the eigenvalues or the covariance matrices. Additionally, since the process can be iteratively performed, one can monitor the magnitude of the residual, which is the subspace projection error. In various embodiments, the process may be terminated when the magnitude of the error is acceptably small.

Another valuable aspect of the described embodiments is that no assumptions are made about the spatial or temporal adjacency of points and frames. In particular, although the $a_i[x]$ vectors do tend to be smooth in space, this smoothness results only from the smoothness and spatial correlations of the original training frames.

Yet another valuable aspect of the described embodiments is that once the final subspace dimension, M, is chosen, the $a_i[x]$ and $b_i[x]$ vectors are not uniquely determined by the reduction (e.g. lessening, minimization) of error. What is desired is that the subspace is be spanned by the basis vectors. In various embodiments, multiplication of the basis vectors by any nonsingular matrix should result in an additional set of vectors which span the same space. Further, the multiplication of the basis vectors by any orthogonal M dimensional rotation matrix should result in an orthonormal basis for the subspace. This property is quite useful to generate basis vectors that are more "local" the original basis vectors. In various embodiments, as will be described below, the "localized" basis vectors are used to help in selection of "key points."

In various embodiments, the Point Multiplication process may include, after computing a subspace and set of key points using the training set, using values of selected key points and using a least squares projection onto the subspace to determine the pose space coordinates. The statistically determined pose is then taken as the value of $\hat{Q}$ for that pose space coordinate.

Figure 3A:
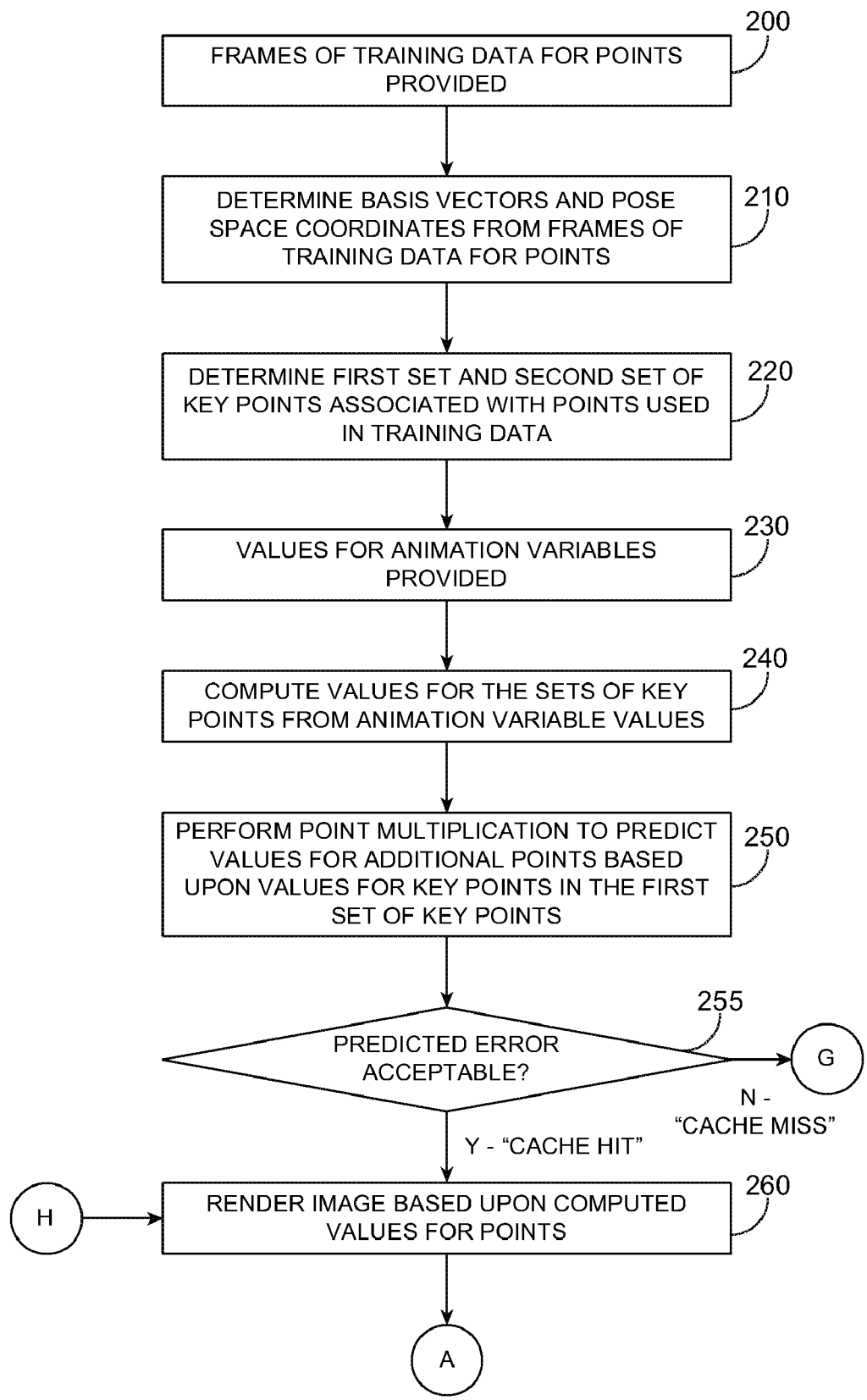
FIGS. 3A-B illustrate a flow diagram according to various embodiments of the present invention.
Figure 3B:
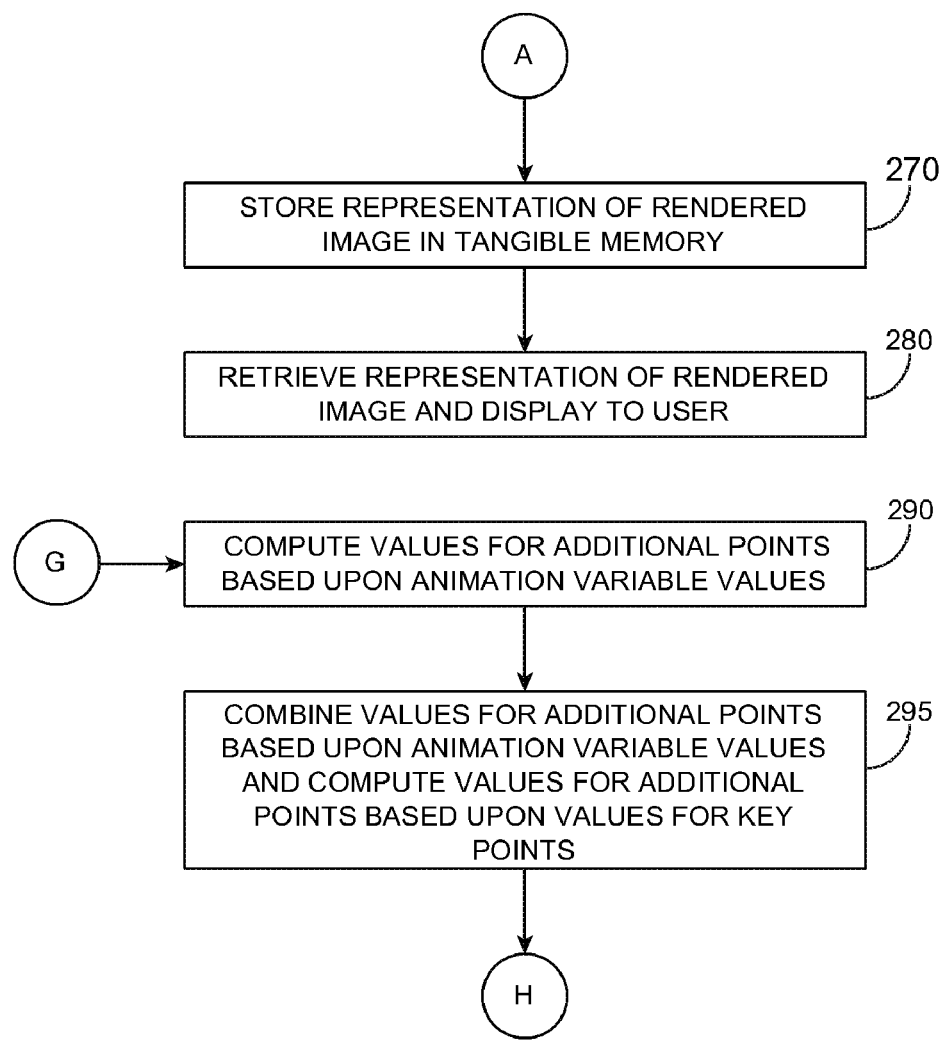

FIGS. 3A-B illustrate a flow diagram according to various embodiments of the present invention. Initially, a set of training frames Q, as described above is provided, step 200. In various embodiments, each frame defines values for animation variables for a number of sample training points at a defined frame (time) as derived from data specified by an animator, lighting user, or the like. As merely an example, an animator may specify specific poses for an object. Next, based upon the pose data, the positions "x" for a defined number of surface locations on the object can be calculated for each point, for each specific pose, to determine Q. As another example, a lighter may specify specific illumination sources being positioned in a scene. Next, based upon these sources, illumination values "x" for the training points in the scene can be calculated for each illumination configuration to determine Q. In one example, the number of training points in a training set may range from about 1000 to about 4000 points. In other embodiments, a greater number of training points or a fewer number of points may be specified for a training frame.

In various embodiments, based upon the set of training frames Q, the basis vectors $a_i[x]$ and the pose space coordinates $b_i[t]$ are determined, step 210. As discussed above, techniques such as empirical orthogonal function, or single value decomposition can be used to determine the basis vectors. In various embodiments, the number of basis vectors is on the order of 10 to 20. In other embodiments, a greater or fewer number of basis vectors may be used, depending upon performance constraints, accuracy constraints, and the like.

In response to the basis vectors, in various embodiments, key points are selected from training points from the set of training frames, step 220. In other embodiments, key points need not be points from the training points. Further detail regarding this step are described below.

In various embodiments, steps 200-220 may be performed off-line, e.g. before run-time.

Figure 1A:
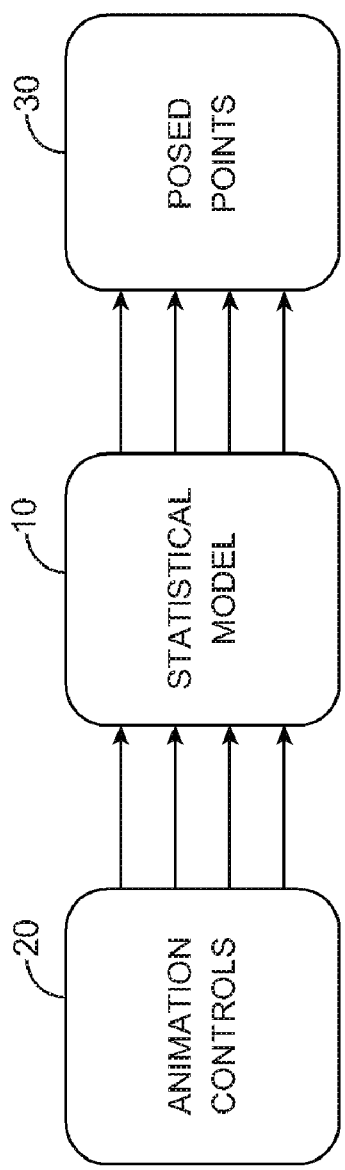
FIG. 1A illustrates a schematic block diagram of a general statistical modeling approach.
Figure 1B:
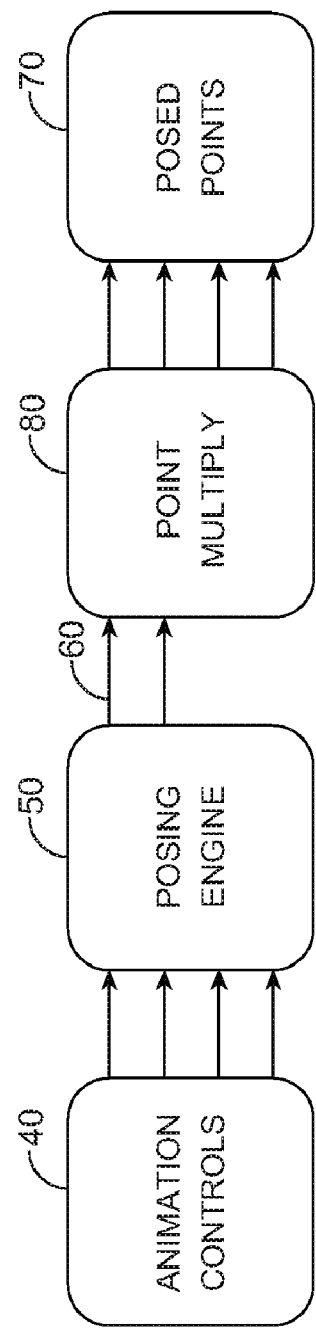
FIG. 1B illustrates a block diagram according to various embodiments of the present invention.

In various embodiments of the present invention, during production run-time, values of animation variables are specified, step 230. As examples of this step, an animator may specify displacements, geometric parameters, and the like as the animation values; or a lighter may specify a specific set of illumination sources in a scene, or the like. In various embodiments, any conventional animation environment or lighting environment may be used to specify these animation values. In some embodiments, this corresponds to animation control 40, in FIG. 1B.

Next, in response to the given values for the animation variables, computed values are determined in a conventional manner for key points and other points identified above, step 240. In various embodiments, values of the key points in all the distinct groups of key points are determined. In various embodiments directed to object posing, based upon the animation values, the pose values for the key points are determined. In some embodiments, the posing engine and posing results determined in this step correspond to elements 50 and 60, in FIG. 1B. In other embodiments, the computed values need not be determined by inputting the animation values into "full" animation engine, but may be computed by inputting the animation values into a more simplified animation engine.

In various embodiments, based upon the determined values for the key points, values for other points may be determined, step 250. In some embodiments, the key points are projected onto the subspace while reducing (e.g. lessening, minimizing) a least squares error. The result of this operation is the determination of pose space coordinates $b_i$ for a given frame. In other words, $b_i$ are determined such that they weight the basis function $a_i$, to match the values of the key points (with reduced least squares error). In some embodiments, values for some or all of the points for points specified in the training set Q may be determined, and in other embodiments, values for points not specifically specified in training sets may also be determined. In some embodiments, the output of this step from posing engine 50 are posed points 70, in FIG. 1B.

In some embodiments of the present invention, the key points may not be the final desired points used for subsequent rendering. Instead, the values of the key points may be used as approximations. As an example, values of key points may be computed using direct illumination samples to locate a point in an indirect illumination space. As another example, a key point may represent enveloped point values to provide more elaborate articulation.

In various embodiments of the present invention, the object surface may be rendered, step 260. In some embodiments of the present invention, the values determined for the key points may or may not be used in this operation. In various embodiments, any conventional rendering engine may be used to perform this step. In some embodiments, Pixar's Renderman product can be used. The resulting image may be further processed, if desired, and a representation of the image is stored into computer memory, step 270. The representation of the image may be retrieved from the memory, or transferred to another memory, such as film media, optical disk, magnetic disk, or the like. Subsequently, the other memory is used to retrieve the representation of the image, and the image may be output for viewing by a user, step 280. For example, the image may be output to an audience from film media, viewed by the animator on a computer display, viewed by a consumer from an optical storage disk, or the like.

Selection of Key Points

In various embodiments of the present invention, when using key points for determining a pose in a subspace there are two potential sources of error. A first one is projection error, and a second one is cueing error. Projection error occurs, for example, when the pose specified by the user, e.g. animator, may not be in the subspace. In other words, the specified pose is outside the training set of poses, for example. Such errors may also occur if a lighting configuration is outside the set of training lighting configurations.

Cueing error occurs when the subspace locations determined from the least squares fit to the key points, described in step 250, above are not the closest point in the subspace to the desired pose. In other words, cueing error may be caused by sub-optimal selection of the key points from the subspace, as key point values are used as distance proxies. In light of the potential sources of error, various embodiments of the present invention may include an iterative approach for selecting the key points from the subspace that attempts to minimize/reduce cueing error.

Figure 4A:
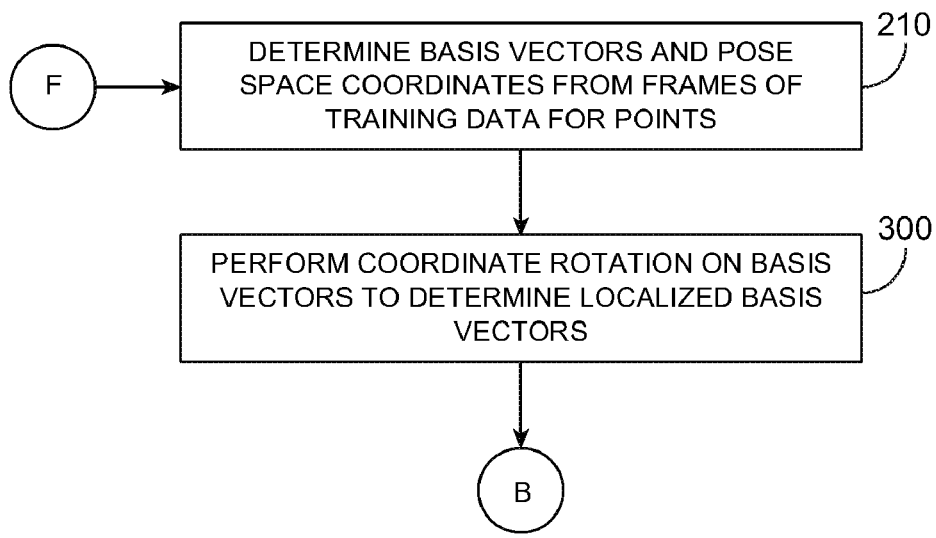
FIGS. 4A-C illustrate a flow diagram according to various embodiments of the present invention.
Figure 4B:
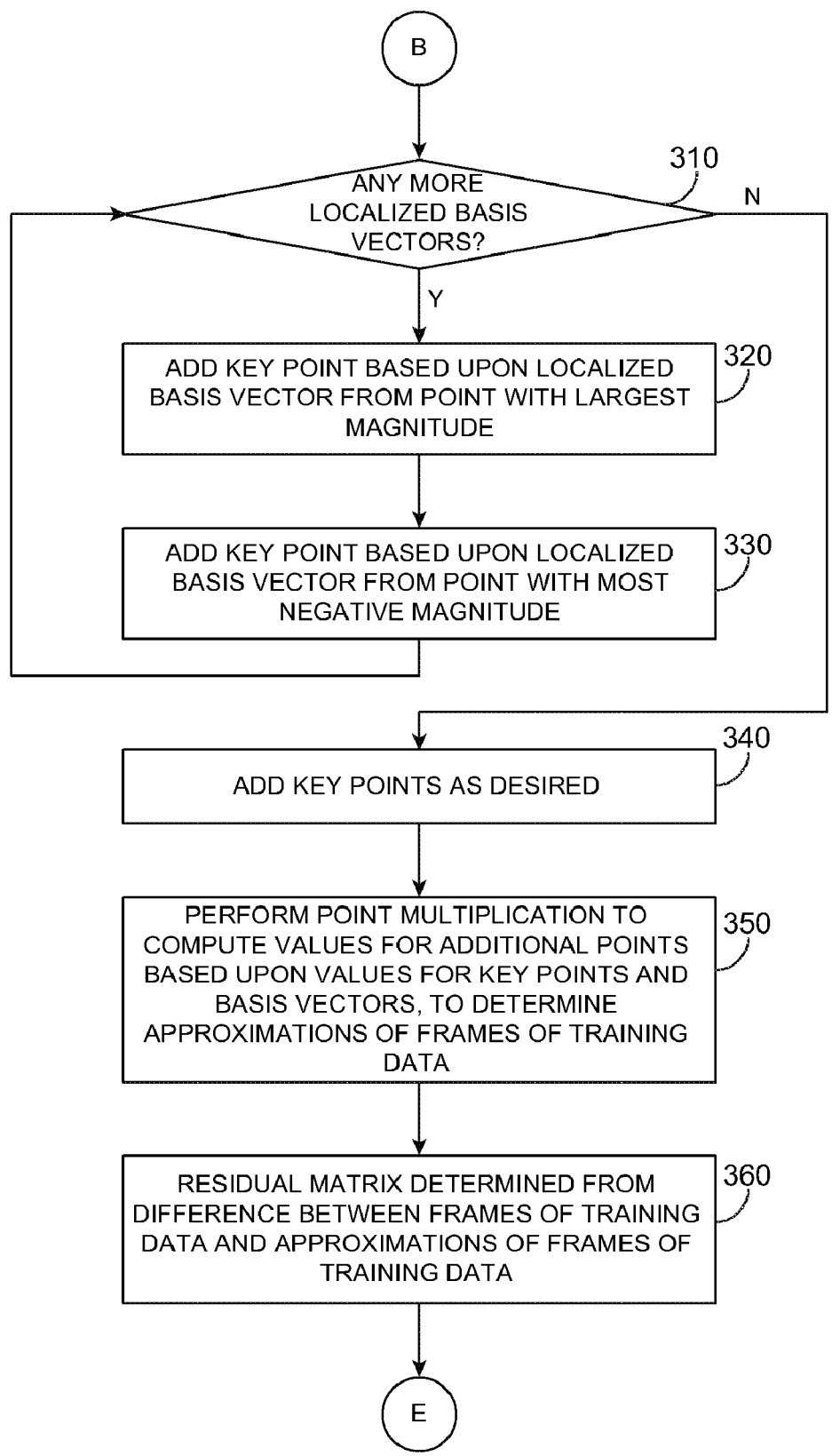
Figure 4C:
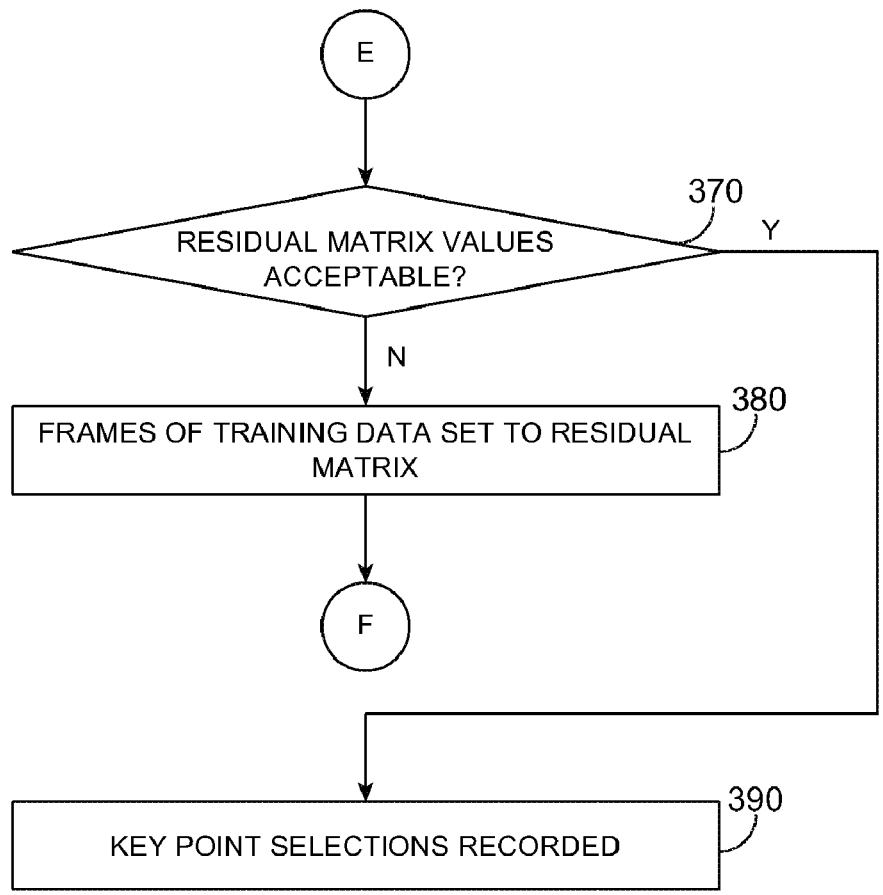

FIGS. 4A-C illustrate a flow diagram according to various embodiments of the present invention. More specifically, FIGS. 4A-C illustrate a more detailed process for step 220, in FIG. 3. In various embodiments of the present invention, as discussed in step 210, basis vectors $a_i[x]$ and the pose space coordinates $b_i(t)$ are determined based upon the set of training frames Q.

Next, a coordinate rotation is performed on the basis vectors, step 300. In various embodiments, the Varimax method is used which computes an orthogonal rotation that maximizes the ratio of the 4th moment to the 2nd moment of the basis vectors. After rotation, the rotated basis vectors provide a measure of locality. In other words, the coordinate rotation localizes the basis vectors by maximizing the variation of a small set of points in each basis vector (in turn driving the variation of the other points towards zero). In other embodiments, other methods for performing coordinate rotation can also be used.

Next, in various embodiments, for each localized basis vector, step 310, two points are selected as key points from each of the rotated vectors, steps 320 and 330. In some embodiments, a first point may be the point with the largest positive magnitude in the basis vector, step 320; and the second point may be the point whose inner product with the first point has the largest negative value, step 330. In some embodiments, steps 320 and 330 may select key points with less than the largest magnitude or greater than the largest negative value, depending upon specific implementation or design.

This type of technique for discovering statistical structure is known as teleconnection analysis. In effect, this technique essentially chooses the point that moves the most when this (localized) basis function is excited as well as the point that is most negatively correlated to the rotated basis function. The process may then be repeated for each basis vector.

In various embodiments, in addition to the key points determined by the above procedure, additional key points may be selected from the subspace, step 340. For example, in some embodiments, there may be critical fiducial points identified by the character (or lighting) designer that are manually selected as key points. For example, the designer may include key points in areas of high movement, such as eyelids, the corners of a mouth, or the like. As another example, for rendering applications a sparse grid of key points may specified to avoid having large regions of a surface not being represented by key points.

In various embodiments of the present invention, given this set of key points and the subspace basis vectors, a Point Multiplication approximation for each of the columns of the training matrix Q is determined, step 350. In some embodiments, the Point Multiplication approximation may include using a least squares projection onto the subspace to determine pose space coordinates $\hat{Q}$.

In various embodiments, a residual matrix is then determined by subtracting the approximation $\hat{Q}$ from the corresponding columns of Q, step 360. The residual matrix represents the error (both projection and cueing error) when approximating the training set Q (many points) using the current set of key points (fewer points).

Based upon the error described by the residual matrix, step 370 additional points may selected as key points, until the error reaches an acceptable error bound. In various embodiments of the present invention, if the error is unacceptable, the residual matrix is set as the training set Q, step 380, and the process described above is repeated. Using the residual matrix in this iterative process allows the points to be added as key points to thereby reducing the cueing error. Although, in various embodiments of the present invention, steps 370 and 380 need not be performed. The identification of the key points are then stored for later use, for example in step 240, step 390.

A subtle point in the embodiments described above is that the basis vectors constructed during iterations of this process may be discarded. Instead, the all basis vectors determined in step 210 used for the run-time Point Multiplication reconstruction may be computed from the initial training matrix Q.

Character Articulation Examples

Embodiments of the present invention were applied to the area of non-skeletal character articulation, and more particularly to the area of facial articulation. Faces are particularly difficult to replace with statistical models because they often have hundreds of animation controls, many of which are very complex and non-linear, as described above. In the case of human faces, the number of degrees of freedom are small, thus the inventors have verified that embodiments of the techniques described above work well.

By using the computed key point positions as input, embodiments of the Point Multiplication technique were able to avoid complex nonlinearities and were able to simulate facial articulation. As noted in FIG. 1A, using animation variables to directly drive was difficult due to such complex nonlinearities. Additionally, faces do not have the benefit of skeletal structure and joint angles used by other parts of the body as input to their statistical models.

In various experiments, facial animation of a boy character were used for testing purposes. The data set included about 8322 frames of animation from 137 animation sequences. In order to provide an independent data test for the Point Multiplication process the animation sequences were divided into two sets, one was used to train the model (2503 poses chosen from 44 randomly selected sequences) and the second was used for validation (the remaining 5819 poses).

Figure 5A:
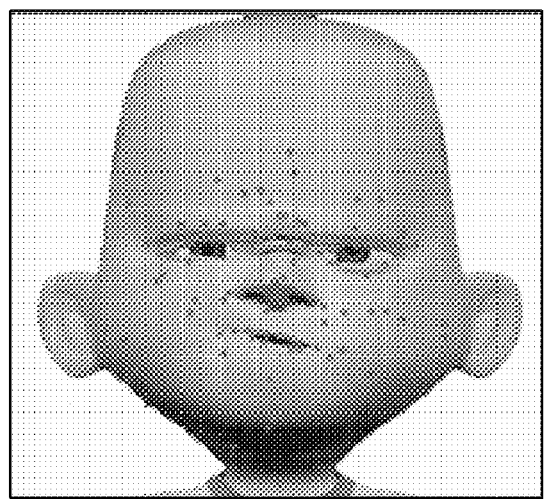
FIGS. 5A-C illustrate a comparative examples of embodiments of the present invention.
Figure 5B:
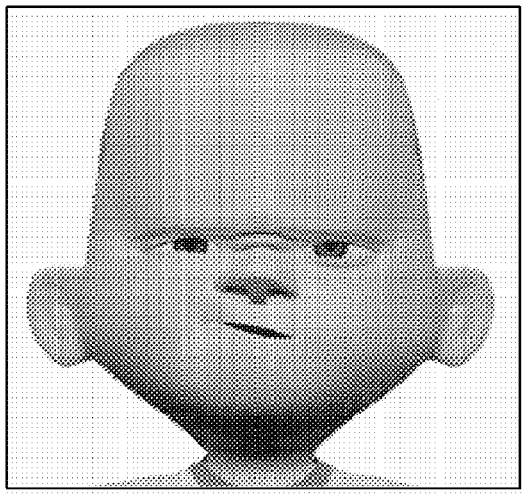
Figure 5C:
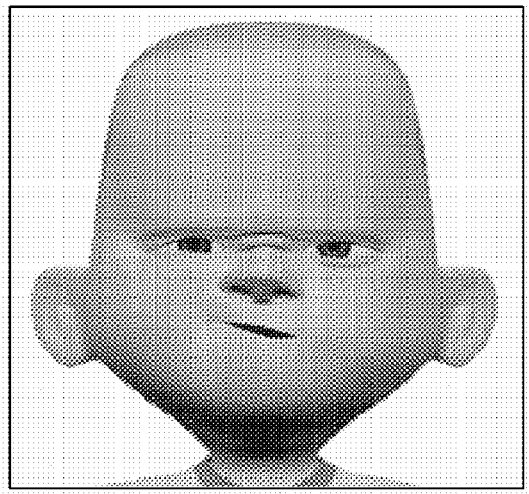

FIGS. 5A-C illustrate a comparative examples of embodiments of the present invention. Using embodiments of the process described above, 85 basis vectors posed by 170 key points was sufficient to pose the model to very small errors in the training segments. The key points identified are shown in FIG. 5A. The facial model computed by posing only the 170 key points and then using Point Multiplication to determine the location of 2986 points is shown in FIG. 5B. In comparison, the facial model computed by directly posing all 2986 articulated facial points is illustrated in FIG. 5C. As illustrated the posing of the character in FIG. 5B is very close to the pose in FIG. 5C. Experimentally, it was determined that the maximum error between any point of the pose in FIG. 5B and FIG. C is than 1% of the diagonal of the head bounding box for over 99.5% of the test poses.

The reduction in computation by computing poses for key points and using Point Multiplication reduces the amount of time necessary to compute, for example, a surface pose. In various embodiments, the characters typically modeled by the assignee of the present invention, typically employed fairly complicated kinematic deformer networks. Presently, it has been determined that for faces, the computation time is in-between near linear cost per point calculation and a constant cost (where posing a small set of points is no less expensive than posing than the full face).

In some experiments, for example, the test character in FIGS. 5A-C, it has been determined that the cost of posing 170 key points is about 10% of the cost of posing the full 2986 points. In particular, all 2986 points can be posed in 0.5 seconds on average, while the 170 key points can be posed in 0.05 seconds on average. Additionally, the Point Multiplication process takes 0.00745 seconds (e.g., 7.45 ms) on average. As a result, the speed-up in posing time is approximately 8.7 times. In some embodiments, the speedup may not be linear with respect to the key point to total point. This is believed to be because the key points often require more complicated deformations than the other points. For example, the mouth points require more effort to pose than the points on the back of the head (representing a smoother surface). Another reason is believed to be because in the full set of points, multiple points can sometimes reuse computations. Thus posing such related points do not require twice the computations.

In various embodiments, the number of key points with respect to the full number of points may range from approximately 1%-5%, 5%-10%, 10%-25%, or the like.

The examples described above relied upon a character posed using a kinematic deformation rig. However, it should be noted that embodiments may also be applied to poses defined by physical simulation, hand sculpting, or the like. In such embodiments, first a version of the face that can be manipulated by the animator at runtime (the control face) is created. Next, a training set of poses containing pairs of the physically simulated (or hand sculpted) face and the corresponding pose of the control face are used as training sets. Then, at runtime, for example, the animator poses the control face and the system uses the control face points to find the projection into the joint (control face, simulated face) subspace and computes the corresponding simulated face, based upon the key point concept and Point Multiplication concept, described above.

Additional Examples

Embodiments of the present invention may also be applied to computation of indirect illumination contributions, as mentioned above. These rendering problems are particularly well suited to acceleration using various embodiments as they often have a large fraction of the total computation in a final gather step. Typically, the computational costs vary nearly linearly with the number of points computed, thus it is desirable to reduce the number of computations.

Figure 6A:
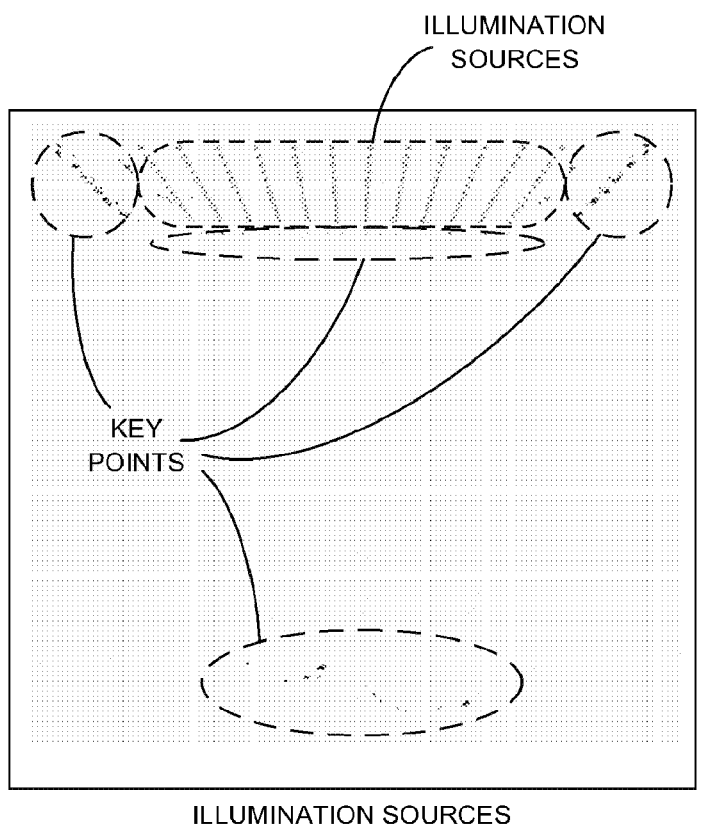
FIGS. 6A-D2 illustrate examples according to embodiments of the present invention.

FIGS. 6A-D2 illustrate examples according to embodiments of the present invention. More specifically, FIGS. 6A-D2 illustrate an indirect illumination problem based on a Cornell box. In this example, each training frame was generated by illuminating the box using a single point light from a grid of 144 lights along the ceiling, see FIG. 6A. From the training set, 32 illumination basis functions were selected and 200 control points (key points 400) were identified.

Experimentally, embodiments of the Point Multiplication process were performed computing the indirect illumination contributions at a series of light locations scattered near the training illumination sources as seen in FIGS. 6B1, 6C1, and 6D1. For comparison, the fully computed indirect illumination solutions are respectively illustrated in FIGS. 6B2, 6C2, and 6D2. As these images show, the lighting is accurately estimated via the embodiments of the Point Multiplication process. Further, the resulting errors are quite small.

In various embodiments of the present invention, the use of the lighting at key points as input to the system, not lighting variables (e.g. light position) allows the system to handle changes in the lighting variables rather easily. For instance, changing the light type, or distance falloff, etc. normally has a complex, nonlinear effect on the resulting indirect illumination. In contrast, because embodiments of the present invention computes the indirect illumination at the key points and uses the illumination itself to drive the statistical model, there is no need to determine the result of changes of animation variables to the final indirect illumination as other methods would. In a production setting where lights have many complex and often interacting controls, this is huge benefit.

Other embodiments of the present invention may be applied to interactive relighting techniques including global illumination, and other illumination-related applications.

The illumination rendering tests presented herein have performed the calculations using image space locations, however in other embodiments of the present invention, the illumination data can easily be stored in a spatial data structure or texture map to accommodate moving cameras and geometry.

Further embodiments can be envisioned to one of ordinary skill in the art after reading this disclosure. In other embodiments, combinations or sub-combinations of the above disclosed invention can be advantageously made. The block diagrams of the architecture and graphical user interfaces are grouped for ease of understanding. However it should be understood that combinations of blocks, additions of new blocks, re-arrangement of blocks, and the like are contemplated in alternative embodiments of the present invention.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer implemented method performed by a computer system programmed to perform the method includes:
   determining by the computer system an animation variable response subspace within an animation variable response space associated with an animation variable, in response to a set of training data for the animation variable;
   determining by the computer system a set of characteristic calculation key points configured to allow navigation within the animation variable response subspace in response to the set of training data, wherein the characteristic calculation key points are mathematically selected to describe non-linear animation model responses to the set of training data in the animation variable response subspace;
   calculating by the computer system animation variable response values for the set of characteristic calculation key points in the animation variable response subspace in response to input data for the animation variable, wherein the input data is not identical to the set of training data; and
   predicting by the computer system animation variable response values for a set of points within the animation variable response space in response to animation variable response values for the set of characteristic calculation key points in the animation variable response subspace.

2. The method of claim 1 wherein determining by the computer system the animation variable response subspace comprises determining by the computer system a plurality of basis vectors of the subspace in response to the set of training data for the animation variable.

3. The method of claim 2 wherein determining by the computer system the animation variable response subspace further comprises determining by the computer system a plurality of localized basis vectors of the subspace in response to a coordinate rotation of the plurality of basis vectors of the subspace.

4. The method of claim 2 wherein determining by the computer system the set of characteristic calculation key points comprises determining by the computer system characteristic calculation key points in response to the plurality of basis vectors of the subspace.

5. The method of claim 1 wherein the set of characteristic calculation key points comprise key points associated with points in the set of points.

6. The method of claim 5 wherein a characteristic calculation key point from the set of characteristic calculation key points is not within the set of points.

7. The method of claim 1 further comprising:
   rendering by the computer system an image in response to animation variable response values for a set of points;
   wherein the animation variables response values are selected from a group consisting of: articulation values, and illumination values.

8. The method of claim 1
   wherein the set of characteristic calculation key points are selected from the set of points; and wherein a range of percentages of a number of points in the set of characteristic calculation key points to a number of points in the set of points is selected from a group consisting of: 1%-5%, 5%-10%, 10%-25%.

9. The method of claim 1
wherein the set of training data comprises a set of training points; and
wherein the set of characteristic calculation key points are automatically determined from the training set of points.

10. A computer system programmed to predict animation variable response values for a set of points includes:
a memory configured to store a set of training data for an animation variable;
a processor coupled to the memory, wherein the processor is programmed to determine an animation variable response subspace within an animation variable response space, in response to a set of training data for the animation variable,
wherein the processor is programmed to determine a set of characteristic calculation points configured to allow navigation within the animation variable response subspace in response to the set of training data, wherein the characteristic calculation points are mathematically selected to describe non-linear animation model responses to the set of training data in the animation variable response subspace;
wherein the processor is programmed to calculate animation variable response values for the set of characteristic calculation points in the animation variable response subspace in response to input data for the animation variable, and
wherein the processor is programmed to predict the animation variable response values for a set of points within the animation variable response space in response to animation variable response values for the set of characteristic calculation points in the animation variable response subspace.

11. The computer system of claim 10 wherein the processor is programmed to determine a plurality of basis vectors of the subspace in response to the set of training data for the animation variable.

12. The computer system of claim 11 wherein the processor is programmed to determine a plurality of localized basis vectors of the subspace in response to a coordinate rotation of the plurality of basis vectors of the subspace.

13. The computer system of claim 11 wherein the processor is programmed to determine characteristic calculation key points in response to the plurality of basis vectors of the subspace.

14. The computer system of claim 10 wherein the set of characteristic calculation points comprise points associated with points in the set of points.

15. The computer system of claim 14 wherein a characteristic calculation point from the set of characteristic calculation points is not within the set of points.

16. The computer system of claim 10 further comprising:
code that directs a processor to render an image in response to animation variable response values for a set of points;
wherein the animation variables response values are selected from a group consisting of: articulation values, and illumination values.

17. The computer system of claim 10
wherein the set of training data comprises a set of training points; and
wherein the set of characteristic calculation points are automatically determined from the set of training points.

18. A computer program product stored on a non-transitory computer-readable tangible media comprising computer-executable software code executable on a computer system comprising a processor comprises:
code that directs the processor to determine an animation variable response subspace within an animation variable response space associated with an animation variable, in response to a set of training data for the animation variable;
code that directs the processor to determine a set of characteristic calculation key points configured to allow navigation within the animation variable response subspace in response to the set of training data, wherein the characteristic calculation key points are mathematically selected to describe non-linear animation model responses to the set of training data in the animation variable response subspace;
code that directs the processor to calculate animation variable response values for the set of characteristic calculation key points in the animation variable response subspace in response to input data for the animation variable; and
code that directs the processor to predict animation variable response values for a set of points within the animation variable response space in response to animation variable response values for the set of characteristic calculation key points in the animation variable response subspace.

19. The computer program product of claim 18 wherein code that directs the processor to determine the animation variable response subspace comprises code that directs the processor to determine a plurality of basis vectors of the subspace in response to the set of training data for the animation variable.

20. The computer program product of claim 19 wherein code that directs the processor to determine the animation variable response subspace further comprises code that directs the processor to determine a plurality of localized basis vectors of the subspace in response to a coordinate rotation of the plurality of basis vectors of the subspace.

21. The computer program product of claim 19 wherein code that directs the processor to determine the set of characteristic calculation key points comprises code that directs the processor to determine characteristic calculation key points in response to the plurality of basis vectors of the subspace.

22. The computer program product of claim 18 wherein the set of characteristic calculation key points comprise key points associated with points in the set of points.

23. The computer program product of claim 18 wherein a characteristic calculation key point from the set of characteristic calculation key points is not within the set of points.

24. The computer program product of claim 18
wherein the set of characteristic calculation key points are selected from the set of points; and
wherein a range of percentages of a number of points in the set of characteristic calculation key points to a number of points in the set of points is selected from a group consisting of: 1%-5%, 5%-10%, 10%-25%.

25. The non-transitory computer-readable tangible media of claim 18 wherein the set of training data comprises a set of training points; and wherein the set of characteristic calculation key points are automatically determined from the set of training points.

* * * * *